United States Patent [19]

Sauer et al.

[11] Patent Number: 5,322,259
[45] Date of Patent: Jun. 21, 1994

[54] PROPORTIONAL MAGNET VALVE

[75] Inventors: Axel Sauer, Nürtingen; Alfred Trzmiel, Grafenberg, both of Fed. Rep. of Germany

[73] Assignee: Hydraulik-Ring Antriebs- und Steuerungstechnik GmbH, Nürtingen, Fed. Rep. of Germany

[21] Appl. No.: 930,979

[22] Filed: Aug. 14, 1992

Related U.S. Application Data

[63] Continuation of Ser. No. 729,421, Jul. 12, 1991, abandoned.

[30] Foreign Application Priority Data

Jul. 13, 1990 [DE] Fed. Rep. of Germany ....... 4022395

[51] Int. Cl.⁵ ............................................. F16K 31/02
[52] U.S. Cl. ........................... 251/129.08; 251/129.18
[58] Field of Search ...................... 251/129.08, 129.18

[56] References Cited

U.S. PATENT DOCUMENTS

| | | | |
|---|---|---|---|
| 4,442,998 | 4/1984 | Ohyama et al. | 251/129.08 |
| 4,493,474 | 1/1985 | Ohyama | 251/129.01 X |
| 4,771,984 | 9/1988 | Szablewski et al. | 251/129.18 X |
| 4,791,958 | 12/1988 | Brundage | 251/129.08 X |
| 4,796,855 | 1/1989 | Sofianek | 251/129.21 X |
| 4,834,337 | 5/1989 | Chorkey et al. | 251/129.18 |
| 4,954,799 | 9/1990 | Kumar | 251/129.08 X |
| 4,988,074 | 1/1991 | Najmolhoda | 251/129.08 |
| 5,065,979 | 11/1991 | Detweiler et al. | 251/129.21 X |

FOREIGN PATENT DOCUMENTS

| | | | |
|---|---|---|---|
| 0001878 | 1/1982 | Japan | 251/129.08 |
| 0090475 | 6/1982 | Japan | 251/129.08 |

*Primary Examiner*—John Rivell
*Attorney, Agent, or Firm*—Albert H. Reuther

[57] ABSTRACT

A proportional magnet valve is provided with which manufacturing tolerances can be equalized and balanced by having an armature with an adjustment member axially adjustable. Consequently it is made possible to adjust every magnet valve that is mass produced so that a predetermined coil current corresponds to a predetermined magnet force and with that corresponding to a predetermined working pressure of a magnet valve. Because of adjustment capability of the armature, no close or narrow manufacturing tolerances must be maintained to permit cost advantageous production of the magnet valve. Also, an exchange of a magnet valve upon wear or damaging thereof is possible in a simple and straight forward manner because the novel magnet valve can be adjusted exactly without difficulty. Consequently, a predetermined pressure-current-characterizing line is maintained so that, independently of tolerance position of the magnetic force and the tolerances of hydraulically effective diameter of the structural parts, always the same pressure-current-characterizing line can be attained.

5 Claims, 4 Drawing Sheets $T_F =$ $1 =$ $F_1 =$ $F_2 =$

PROPORTIONAL MAGNET VALVE

This is a continuation of parent patent application U.S. Ser. No. 729,421-Sauer et al filed Jul. 12, 1991, abandoned as of the date of the filing of the present continuation application upon termination of proceedings in the parent case.

BACKGROUND OF THE INVENTION

1. Field of the Invention

The present invention relates to a proportional magnetic valve for generation of a pressure proportional to applied current, with an axis, which is connected with an armature, which is surrounded by at least one coil, which during current flow therewith in connection with the armature produces a magnetic force, which is directed counter to a closure force effective upon the axis.

2. Description of the Prior Art

With such magnetic valves, hydraulic medium is supplied through a pressure pipe of a working line or conduit. The pressure building-up here is dependent thereon with which closure force the axis of the magnetic valve is held in a closure position, in which the magnetic valve closes-off a tank return line for the hydraulic medium. If the pressure in the working line or conduit exceeds the closure force produced by a pressure spring, the axis is pushed back against this closure force, so that the hydraulic medium can come into the tank return line. In order now to be able to adjust or set different working pressures, the coil has current flow fed thereto whereby a magnetic force results directed counter to the closure force effective upon the axis. Thereby the axis is pushed back already with small or nominal working pressures. With the production or manufacture of such magnetic valves, a problem arises whereby as a consequence of tolerances with the same or identical current values there cannot be set or adjusted the same or identical working pressures.

For this reason, the individual parts of the magnetic valve during manufacture or production must be produced in various narrow, tight or close tolerances, which makes the manufacture or production of such a magnetic valve more expensive.

SUMMARY OF THE INVENTION

An object of the present invention is based thereon to construct or embody the generic proportional magnetic valve in such a manner that with cost-advantageous and simple, straight forward manufacture or production in spite of manufacturing tolerances, the proportional magnetic valve can be so set or adjusted that a predetermined current value corresponds to a predetermined working pressure.

This object is fulfilled thereby that the axial position of the armature in a range or region of the lift or stroke-force characterizing lines of the proportional magnetic valve is so adjustable by at least one adjustment member, that a prescribed, predetermined pressure-current characterizing line is attained.

Manufacturing tolerances with the present inventive proportional magnetic valve can be well-balanced thereby that the armature is set or adjusted axially with an adjustment member. Thus it is possible, to set or adjust every magnetic valve of a series so that a particular or predetermined coil current responds to a predetermined particular magnetic force and with that corresponding to a predetermined working pressure of the magnetic valve. Because of the adjustment capability of the armature, no close or no manufacturing tolerances must be maintained, so that the inventive magnetic valve can be produced in a cost-advantageous and expedient manner. Since the magnetic valve can be simply adjusted in a straight forward manner, the magnetic valve can be installed and employed outstandingly and prominently in mass production or in a great series. Also, an exchange of the magnetic valve upon wear or damaging thereof is possible in a simple straight forward manner, because the new and novel magnetic valve can be set or adjusted exactly without difficulty. The armature, as a consequence of the inventive arrangement and construction can be so set and adjusted that a prescribed, predetermined pressure-current-characterizing line is maintained. Consequently, independently of the tolerance position of the magnetic force and the tolerances of the hydraulically effective diameter of the corresponding structural parts, always the same or identical pressure-current-characterizing line can be attained.

BRIEF DESCRIPTION OF THE DRAWINGS

This, as well as other objects and advantages of the present invention, will appear more clearly from the following specification in conjunction with the accompanying drawings which show the following.

DETAILED DESCRIPTION

Figure 1:
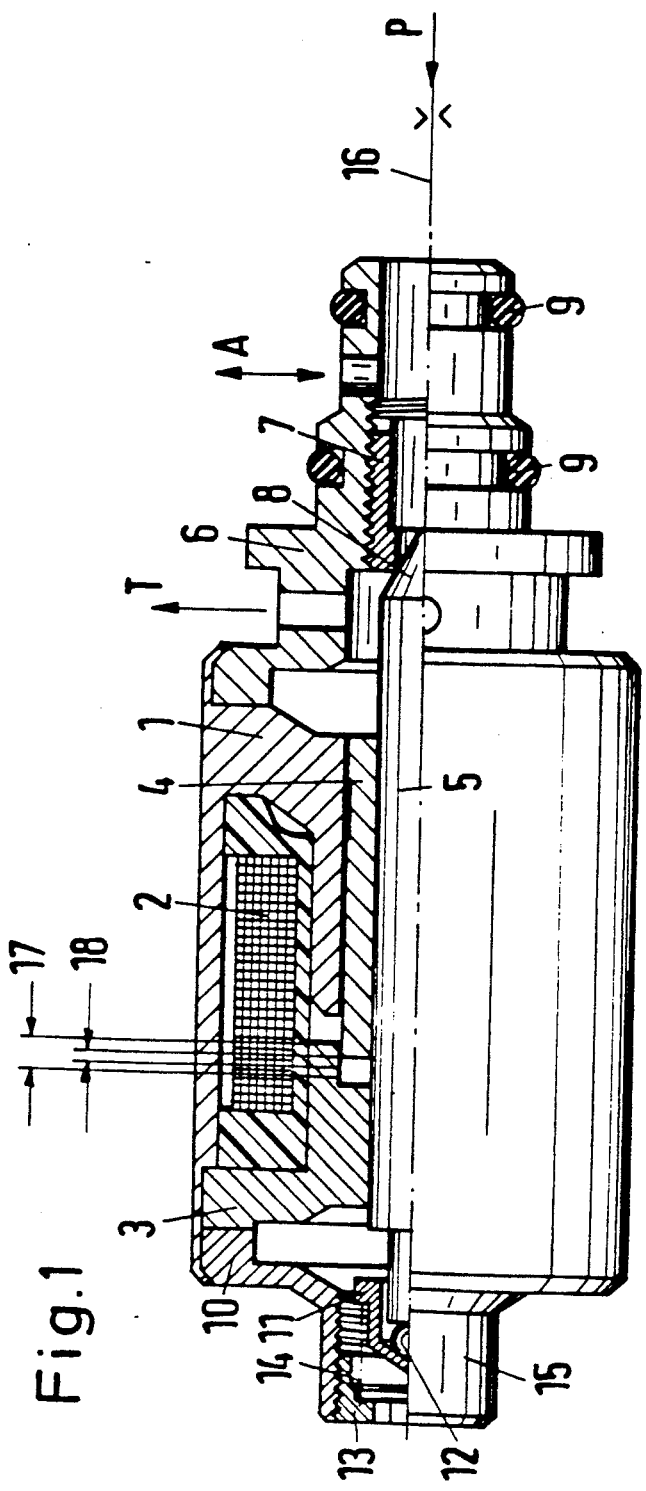
FIG. 1 is a view that shows in an axial half section a proportional magnetic valve constructed and embodied as a proportional pressure regulating valve having features in accordance with the present invention.

The magnet valve according to FIG. 1 has a magnet housing 1, which at one end is connected with a valve housing 6. At the other end in the magnet housing 1 there is inserted or installed a pole core 3 as well as a cover 10, with which the magnet housing 1 is closed at this end. In the magnet housing 1 there is installed or accommodated a circular spool or coil 2 which surrounds an armature 4 with a radial spacing. The armature 4 is seated or secured axially upon an axis 5, which is arranged concentrically in the magnet housing 1 and is adjustable by magnetic force. The axis 5 projects with a closure member 8 into the valve housing 6, in which the closure member 8 engages against a valve seat 7 in an end position.

The oppositely located end of the axis 5 projects into the cover 10, which has a circular extension 15 smaller or reduced in diameter in which a pressure spring 14 is installed or accommodated, which with one end abuts or engages against an adjustment screw 13 and with the other end abuts or engages against a spring disk or plate 11 which subject to intermediate positioning of a ball 12 engages against an end of an axis 5 located opposite to the closure member 8. The setting or adjustment screw 13 is screwed into the circular extension 15. The prestressing or pre-loading of the pressure spring 14 can be set or adjusted in a separate manner with the adjustment screw 13.

A pressure line or conduit 16 for the hydraulic medium existing under a pressure P opens in axial direction into the valve housing 6. The valve housing 6 is provided with a working connection A and a tank connection T. In the installed position, the valve housing 6 is sealed-off relative to the installation chamber by two sealing rings 9 in a known manner.

The axis 5 subject to force of the pressure spring 14 during turning-off of the magnet valve engages sealingly against the valve seat 7 with the closure member 8. The closure member 8 is constructed conically and engages with a conical mantle surface against the valve seat 7. The valve seat 7 is constructed as a threaded sleeve which is screwed into the valve housing 6. During the testing of the magnet valve, the valve seat can be so set or adjusted in a manner still to be described that a prescribed, predetermined pressure-current-characterizing line is attained.

The axis 5 lies in a region between the armature 4 and the cover 10, being slideably shiftable in the pole core 3.

In the currentless position of the magnetic valve illustrated in FIG. 1, the armature 4 has a spacing from the pole core 3. If the circular coil 2 has current supplied thereto then the resulting magnetic force is effective against the force of the pressure spring 14, accordingly reducing the effectiveness thereof. As soon as the working pressure in the working connection A is greater than the remaining pressure of the spring 14, the axis 5 is shifted or pushed back so that the closure member 8 lifts off from the valve seat 7, so that hydraulic medium can come into the tank connection T. With that via the magnitude of the current, a predetermined working pressure can be set or adjusted. In order to attain an accurate pressure-current-allocation in a mass production of this magnet valve, the possibility exists to balance or equalize magnetic force tolerances so that there is assured and guaranteed that predetermined particular current values also can be allotted predetermined particular force values, independently of the respective tolerances in each case. This is made possible by setting or adjustment of the valve seat 7 in the valve housing 6, which is arranged and constructed for this purpose as a screw sleeve. A screw sleeve can be set or adjusted axially in a separate manner in the desired position by turning or rotation within the valve housing 6. Thereby, the axis 5 with the armature 4 is shifted correspondingly axially in the magnet housing 1 against the force of the pressure spring 14. The axis 5 with the armature 4 is so adjusted in the range of the total stroke 17 that the working stroke 18 of the armature 4 lies so within its entire stroke 17 that a predetermined particular current also corresponds to a predetermined particular working pressure. This is further set forth and clarified in greater detail subsequently on the basis for the description for FIGS. 3 and 4. So that the valve seat 7 can be set or adjusted, the valve seat 7 is so constructed that it can be turned or rotated with a suitably adapted screw tool before installation of the magnet valve over the pressure line or conduit 16.

Figure 2:
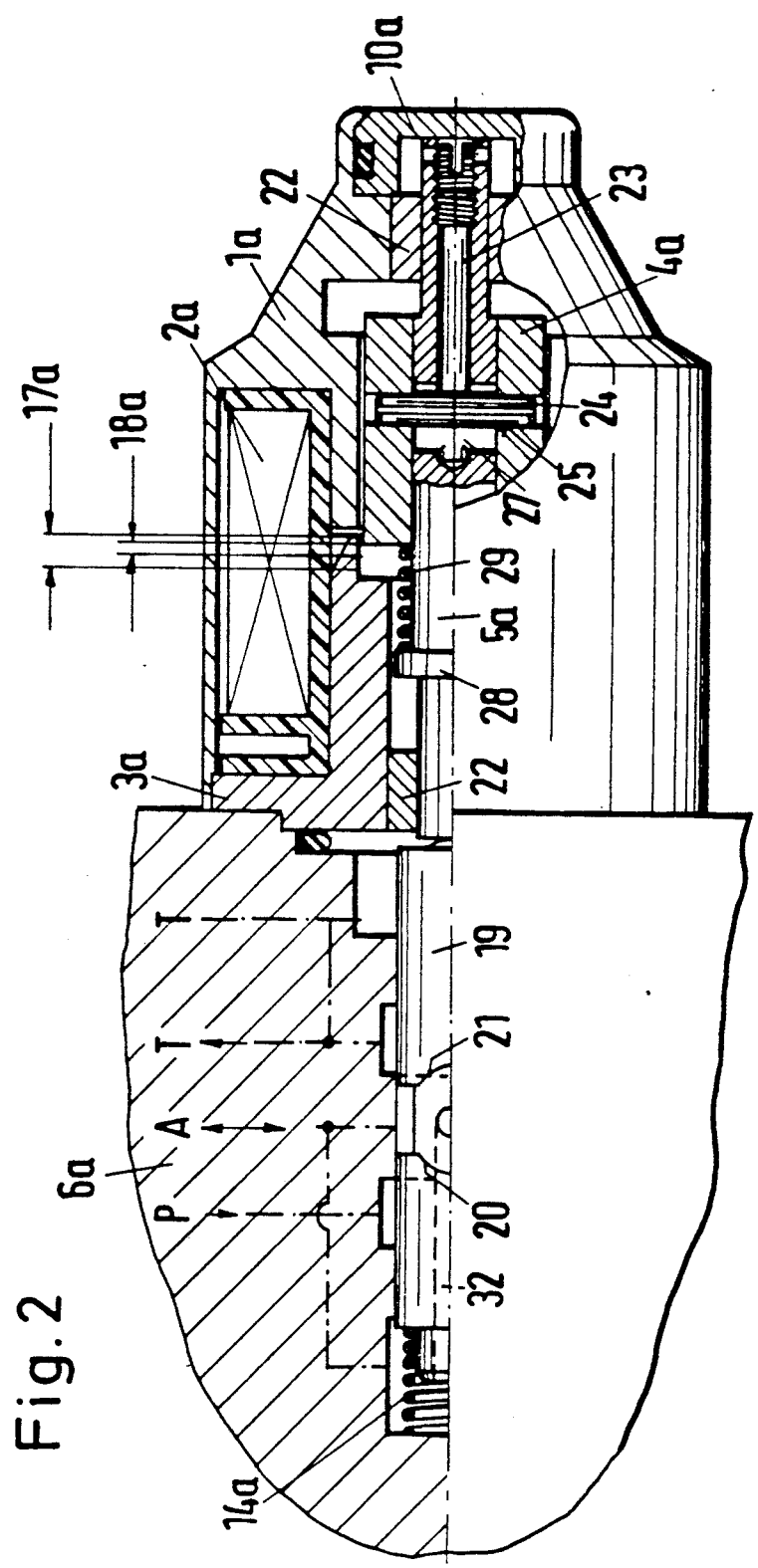
FIG. 2 is a view that shows a portion of the proportional magnetic valve according to the present invention which is arranged and constructed as a slide valve.

The magnet valve according to FIG. 2 is constructed and embodied as a slider valve. It has likewise the magnet housing 1a in which a circular coil or spool 2a is installed and accommodated. The valve housing 6a is connected to the magnet housing 1a and in a known manner being provided with the pressure connection P, the working connection A, and the tank connection T.

In the valve housing 6a there is shiftably or slideably journalled a control slider, which has two control edges 20 and 21. At an end away from the magnet housing 1a, the pressure spring 14a engages, which abuts or supports itself against the valve housing 6a. At the other end, the control slider 19 in a known manner engages against the axis 5a, which is shiftably or slideably journalled in the magnet housing 1a. As a difference with respect to preceding sample embodiment the axis 5a is guided in at least one bearing 22 which is surrounded by the pole core 3a and engages against the same. Upon the axis 5a there is seated axially shiftable the armature 4a, which corresponding to the preceding sample embodiment is constructed in a sleeve shape or configuration. As a difference with respect to the preceding sample embodiment, the armature 4a, however, can be shifted axially against the axis 5a. The axis 5a at an end thereof away or remote from the valve housing 6a is provided with a central bore, in which a setting or adjustment part 23 is installed or accommodated. This adjustment part 23 is constructed as an adjustment screw against which a tension or adjusting pin 24 engages, which lies at right angles to the adjustment part 23 and projects into a diametrical bore 25 of the armature 4a. By turning or rotation of the adjustment part 23, the armature 4a can be shifted axially upon the axis 5a. The axis 5a is provided for the tensioning pin 24 with a transverse bore 27, which is axially so long that the armature 4a can be axially set or adjusted in a desired extent with respect to the axis 5a. The axis 5a is supported and guided with a further bearing 22 in the magnet housing 1a. The tapered end of the magnet housing 1a remote or away from the valve housing 6a is closed by the cover 10a. The cover 10a is provided upon an inner side thereof with a depression or recess, into which the end of the axis 5a providing the adjustment part 23 projects into an end position.

The axis 5a in a region between the control slide 19 and the armature 4a has a collar 28, against which an end of a pressure spring 29 abuts or engages, which with an other end of the pressure spring 29 engages against an end face or front of the armature 4a.

FIG. 2 shows the magnet valve in the rest position with no current being supplied to the coil 2a. The pressure spring 14a, of which the force is smaller than the respective magnet force, presses the control slide 19 and the axis 5a in FIG. 2 toward the right as far as to engagement against the cover 10a. The space or chamber receiving the pressure spring 14a is connected via a connecting bore 32 in the control slider 19 with the working line or conduit A in a known manner.

If the coil 2a is supplied with current, as a consequence of the resulting magnet force, the armature 4a with the axis 5a and with that the control slider 19 is shifted or pushed against the force of the pressure spring 14a. The hydraulic medium can come from the pressure line or conduit P into the working line or conduit A and there can build up the working pressure. Force holds the control slider 19 so long in this position until the pressure force in the working line or conduit A respectively the force effective upon the left end face or front of the control slider 19 in FIG. 2, via the hydraulic medium via the installation chamber of the pressure spring 14a and via force produced by the pressure spring 14a itself becoming equally as great in magnitude as the magnet force. If the pressure force rises or increases, which results from the pressure in the working line or conduit A to increase further, the control slider 19 is shifted or pushed against the magnetic force into the so-called superimposed or cover position, in which both the connection between the pressure line or conduit P and the working line or conduit A as well as also the connection from the working line or conduit A to the tank return flow line T are closed. If the magnetic force or the pressure in the working line or conduit A changes or is varied, the force conditions or relationships are newly set or adjusted on the control slider 19.

Also, with this magnetic valve there is noted that the magnetic force tolerances, which are unavoidable in mass production of such a magnetic valve, can be balanced or equalized in a simple and straight forward manner. For this purpose the armature 4a is shiftably journalled upon the axis 5a by means of the adjustment device 23, 24. The armature 4a is pressed via the pressure springs 29, of which the pre-loading force is greater than the maximum magnetic force, via the tensioning pin 24 positively against the adjustment part 23. If the adjustment part 23 is turned or rotated, the armature 4a shifts itself upon the axis 5a and with that independently as to the control edges 20 and 21 of the control slider in the region or range of the entire stroke 17a of the magnet. The working stroke 18a of the armature 4a accordingly with that can be so adjusted exactly within the entire stroke 17a, that a predetermined particular current value always can have a predetermined particular magnetic force and with that a predetermined pressure in the working line or conduit A allocated therewith, independently thereof, whether the magnet with respect to the production or manufacturing tolerances lie in the upper tolerance limit or lower tolerance limit.

With the two described embodiments of magnetic valves, in a mass production, the pressure-current-characterizing line of this magnet valve can be attained with an example spread or dispersion error or variation as substantially 0.

Figure 3:
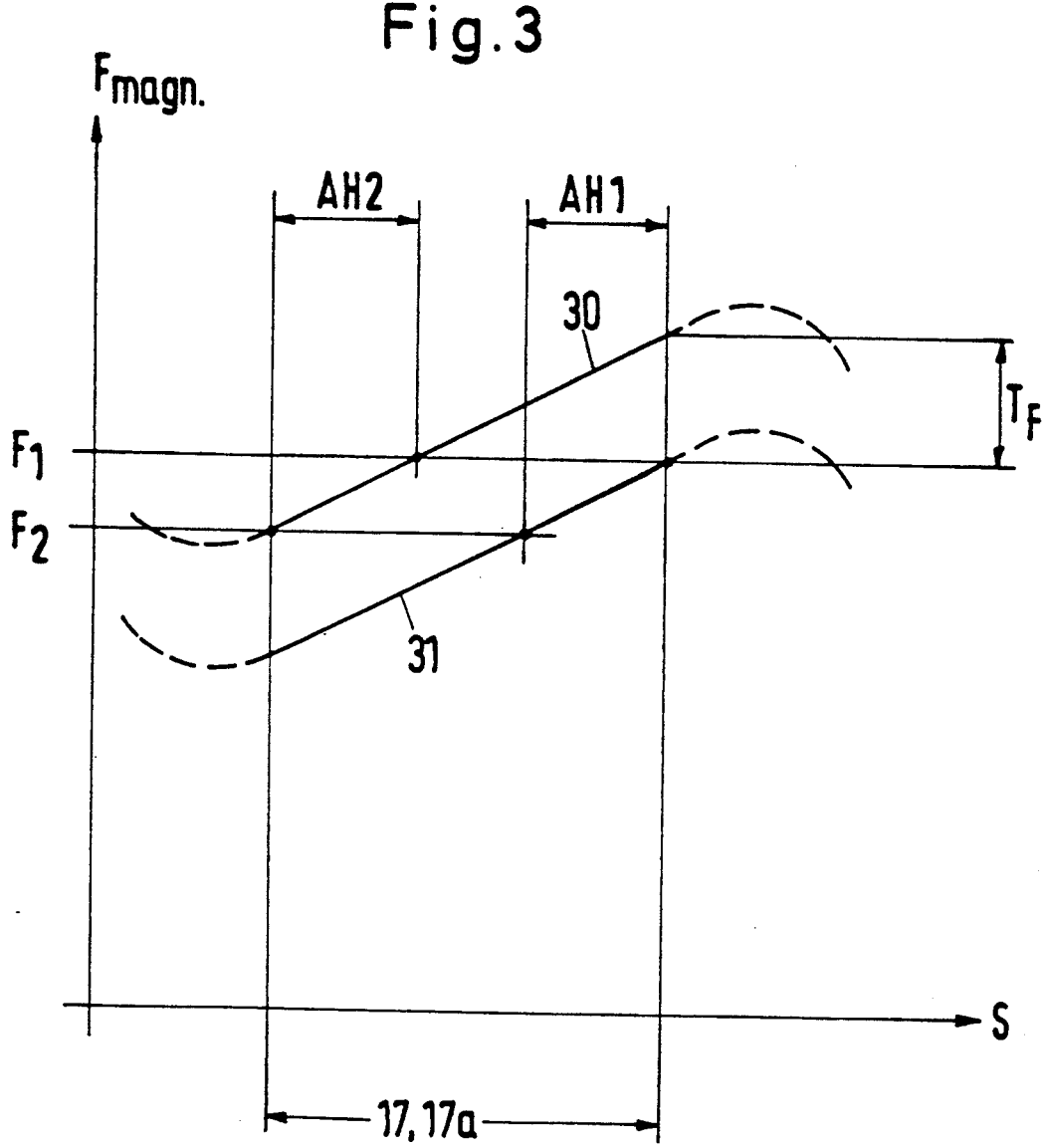
FIG. 3 is a view that shows a setting or adjustment of the present inventive proportional magnetic valve in a force-stroke or lift diagram without taking into consideration any influence of a pressure spring loading or biasing the armature and of the coil current.

This setting or adjustment of the magnetic valves according to FIGS. 1 and 2 is to be set forth and described in greater detail on the basis of FIG. 3. In FIG. 3 the magnetic force $F_{magn}$ is shown applied against the stroke path S. With this illustration or representation, the influence of the pressure spring 14, 14a and the coil current is not taken into consideration. The upper characterizing line 30 is applicable and valid for a strong magnet and the lower characterizing line 31 is applicable and valid for a weaker magnet. The spacing of these two characterizing lines from each other results in a tolerance field $T_F$, within which the characterizing lines of identically the same magnetic valves can vary with a large mass production or manufacturing operation. The two characterizing lines 30, 31 are applied as drawn for the same or identical current respectively. The entire stroke 17, 17a of the armature 4, 4a is so placed that the magnet-force-stroke path-characterizing line 30, 31 extends linearly in the region or range of this entire stroke. The tolerance field $T_F$ sets forth the range of production or series spread or variation with a predetermined particular rated or noted current. Even though as a consequence of mass production of series variation different characterizing lines 30, 31 arise and are encountered, the described magnet valve can be so set or adjusted that with the same or identical working stroke 18, 18a there are encountered or occur equal or identical magnetic forces. With strong magnets with the characterizing line 30 for example the working stroke AH2 is so placed within the entire stroke 17, 17a that with the start or beginning of the stroke the magnetic force $S_1$ and at the stroke end the smaller or more nominal magnetic force $F_2$ results and occurs.

If during series or mass production a magnetic valve is encountered that has a characterizing line 31 lying deeper or lower, the working stroke AH1 thereof is so placed within the entire stroke 17, 17a, that at the start or beginning of the stroke again the same or identical magnetic force $F_1$ and at the stroke end again the lower or deeper located magnetic force $F_2$ will occur or result. The beginning of the stroke is so placed within the entire stroke 17, 17a that after the necessary or required working stroke AH1 respectively AH2, the force equilibrium or balance between the pressure force, spring force and magnetic force comes about and materializes also at the stroke end.

Figure 4:
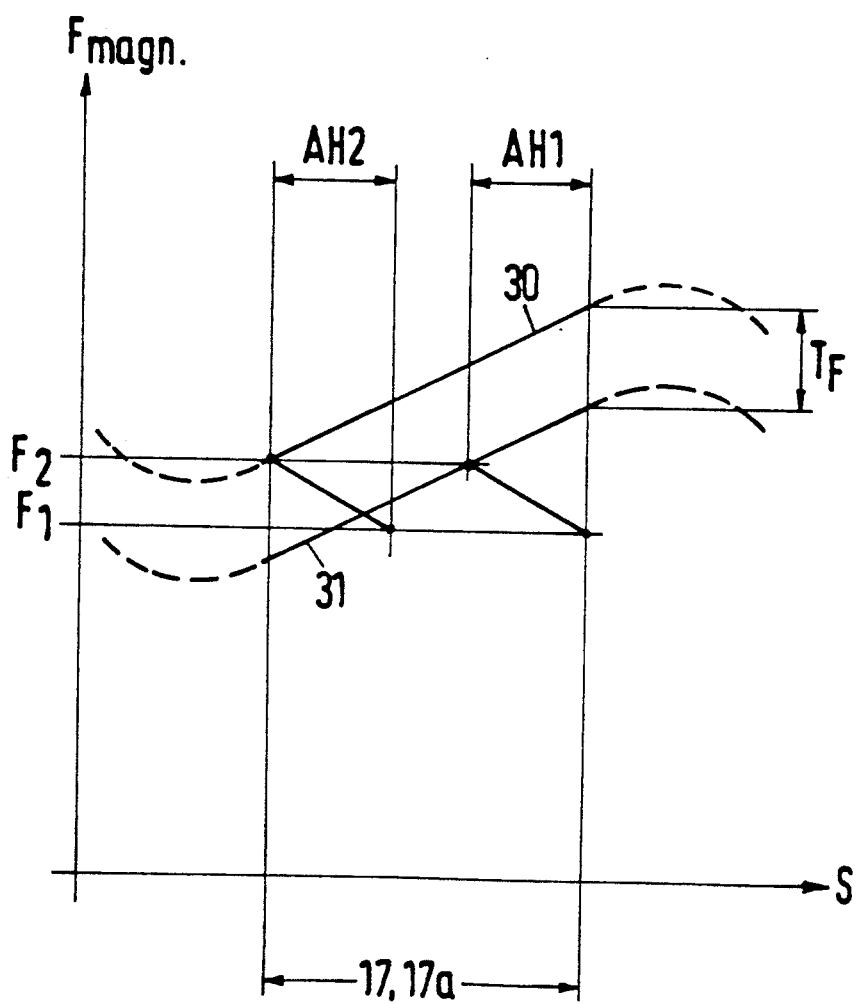
FIG. 4 is a view that shows the setting adjustment of the present inventive proportional magnetic valve in a force-stroke-diagram taking into consideration an influence of a pressure spring loading or biasing the armature and of the coil current.

With the illustration according to FIG. 4, the influence of the pressure spring 14, 14a and of the coil current is taken into consideration. Since the pressure spring 14, 14a is effective against the magnetic force $F_{magn}$, the magnetic force $F_1$ at the stroke beginning or start because of this influence magnitude is smaller than the magnetic force $F_2$ at the stroke end. From this representation there results on the other hand that in spite of the series or the mass production variations at the beginning and at the end of the working stroke AH1 and AH2 respectively the same or identical magnetic force $F_1$ and $F_2$ occurs and is encountered.

With strong magnets having the characterizing line 30 for example the position of the stroke beginning or start $F_1$ of the working stroke AH2 is so placed within the entire stroke 17, 17a, that after according to the required stroke path AH2 there comes about and is caused a force equilibrium or balancing between the pressure force, spring force and magnetic force at the stroke end of the working stroke AH2. The same is true for weak magnets with the characterizing line 31.

As shown by FIGS. 3 and 4, the two magnet valves in spite of mass production or series variations at the beginning of the working stroke AH1 and AH2 respectively provide the same or identical magnetic force $F_1$ and at the end of the working stroke AH1 respectively AH2 provide the magnetic force $F_2$. In this manner the tolerances with the mass production or series manufacture of the magnetic valves can be balanced or equalized in a very simple and straight forward manner whereby respectively there is assured and guaranteed that in spite of the mass production or series variations with a prescribed, predetermined rated or noted current always the same or identical magnetic forces arise and occur within the working stroke.

With the magnetic valve according to FIG. 1, for a setting or adjustment of the valve seat 7, which is constructed or embodied as a screw sleeve, adjustment axially occurs in such a manner within the valve housing 7 that within the entire stroke 17 then the working stroke 18 lies in such a manner that the desired magnetic forces $F_{magn}$ and with that the predetermined or particular pressures arise and occur in the working line or conduit A.

With the magnetic valve according to FIG. 2, the armature 4a is set or adjusted by means of the adjustment part 23 into the desired position relative to the axis 5a. The armature 4a accordingly with that is shifted independently of the control edges 20, 21 of the control slider 19 in the range or region of the entire stroke 17a of the magnetic valve. Accordingly with that during a falling or decreasing magnetic force characterizing line according to FIG. 3 as to a current value, always a predetermined or particular force and with that a predetermined or particular pressure is allocated therewith, independently thereof whether the magnet valve lies at the upper tolerance limit or the lower tolerance limit.

In summary, the present invention provides a proportional magnet valve for generation of a pressure proportional to the applied current, having a rod that is connected with an armature, which is surrounded by a pole core and at least one coil, which during supply of current thereto in connection with the armature generates a magnetic force which is directed counter to a closure force effective upon the rod. The teaching of the present invention is characterized thereby that the axial position of the armature 4, 4a relative to the pole core in the region or range of the stroke force characterizing line of the valve is so adjustable by at least one adjustment member 7, 23 that a prescribed, predetermined pressure-current characterizing line is attained.

The entire stroke of the magnet, the steepness, slope or incline or the magnetic force characterizing lines 30, 31 and the permissible force tolerance are so adjusted or attuned as to each other that the necessary and required working stroke 18, 18a of the strongest magnet valve and weakest magnet valve of a series or mass production quantity can be so realized via adjustment of the armature 4, 4a within the entire stroke 17, 17a, that the forces at the stroke end of the working stroke 18, 18a respectively are the same or identical.

The armature 4 is axially adjustable together with the axis 5.

The adjustment member 7 cooperates with the axis 5.

The adjustment member 7 is a threaded sleeve on the end face or front of which the axis 5 engages. The adjustment member 7 has a valve seat against which a closure member 8 of the rod is resiliently biased, preferably under spring force.

The adjustment member 7 is screwed into a valve housing 6.

The closure member 8 is constructed conically or having a cone shape.

The armature 4a is axially adjustable relative to the axis 5a.

The axis 5a forms an actuating member for a control slider or shift means 19.

The armature 4a under the force of at least one spring 29 engages against the adjustment member 23.

The spring force of the spring 29 is greater than the maximum magnetic force $F_{magn}$.

The axis 5a has an abutment 28, preferably a collar, against which the pressure spring 29 abuts or engages, which spring 29 presses the armature 4a against the adjustment member 23.

The adjustment member 23 is an adjustment screw that is screwed axially into the axis 5a.

In the armature 4a there is provided an abutment part or stop 24 passing transversely therethrough, which abutment or stop 24 under the force of the pressure spring 29 engaging against the armature 4a engages against a free end of the adjustment member 23.

The abutment part or stop 24 extends through a transverse bore 27 of the axis 5a.

The axial length of the transverse bore 27 of the axis 5a is at least equally as large as the maximum adjustment path of the armature 4a.

The present invention is, of course, in no way restricted to the specific disclosure of the specification and drawings, but also encompasses any modifications within the scope of the appended claims.

What we claim is:

1. Proportional magnet valve means for generation of a pressure proportional to applied current, having a rod that is connected with an armature surrounded by a pole core structurally arranged about an axis of the magnet valve means and at least one coil means which upon being supplied with current generates and produces a magnet force in connection with said armature and which is directed opposite to a closure force effective upon the rod, having a basic improvement therewith comprising:

at least one adjustment member to adjust particularly the axial position of said armature per se relative to said pole core in a range of the stroke force characterizing line of said valve means so that a predetermined pressure-current-characterizing line is attained;

said proportional magnet valve means having a decreasing magnet-force-stroke-path-characterizing line; a working stroke of said proportional magnet valve means being smaller than possible entire stroke of said proportional magnet valve means; and the working stroke of the proportional magnet valve means also with different magnet-force-stroke-path-characterizing lines being so adjusted that at an end of the working stroke with different proportional magnet valve means respectively the same magnetic forces result;

said armature being adjustable axially together with said rod along said axis.

2. Proportional magnet valve means for generation of a pressure proportional to applied current, having a rod that is connected with an armature surrounded by a pole core structurally arranged about an axis of the magnet valve means and at least one coil means which upon being supplied with current generates and produces a magnet force in connection with said armature and which is directed opposite to a closure force effective upon the rod, having a basic improvement therewith comprising:

at least one adjustment member to adjust particularly the axial position of said armature per se relative to said pole core in a range of the stroke force characterizing line of said valve means so that a predetermined pressure-current-characterizing line is attained;

said proportional magnet valve means having a decreasing magnet-force-stroke-path-characterizing line; a working stroke of said proportional magnet valve means being smaller than possible entire stroke of said proportional magnet valve means; and the working stroke of the proportional magnet valve means also with different magnet-force-stroke-path-characterizing lines being so adjusted that at an end of the working stroke with different proportional magnet valve means respectively the same magnetic forces result;

said adjustment member being a threaded sleeve and said rod along said axis engages against an end face thereof.

3. Proportional magnet valve means for generation of a pressure proportional to applied current, having a rod that is connected with an armature surrounded by a pole core structurally arranged about an axis of the magnet valve means and at least one coil means which upon being supplied with current generates and produces a magnet force in connection with said armature and which is directed opposite to a closure force effective upon the rod, having a basic improvement therewith comprising:

at least one adjustment member to adjust particularly the axial position of said armature per se relative to said pole core in a range of the stroke force characterizing line of said valve means so that a predetermined pressure-current-characterizing line is attained;

said proportional magnet valve means having a decreasing magnet-force-stroke-path-characterizing line; a working stroke of said proportional magnet valve means being smaller than possible entire stroke of said proportional magnet valve means; and the working stroke of the proportional magnet valve means also with different magnet-force-stroke-path-characterizing lines being so adjusted that at an end of the working stroke with different proportional magnet valve means respectively the same magnetic forces result;

said adjustment member having a valve seat against which a closure member of said rod is resiliently biased.

4. Proportional magnet valve means for generation of a pressure proportional to applied current, having a rod that is connected with an armature surrounded by a pole core structurally arranged about an axis of the magnet valve means and at least one coil means which upon being supplied with current generates and produces a magnet force in connection with said armature and which is directed opposite to a closure force effective upon the rod, having a basic improvement therewith comprising:

at least one adjustment member to adjust particularly the axial position of said armature per se relative to said pole core in a range of the stroke force characterizing line of said valve means so that a predetermined pressure-current-characterizing line is attained;

said proportional magnet valve means having a decreasing magnet-force-stroke-path-characterizing line; a working stroke of said proportional magnet valve means being smaller than possible entire stroke of said proportional magnet valve means; and the working stroke of the proportional magnet valve means also with different magnet-force-stroke-path-characterizing lines being so adjusted that at an end of the working stroke with different proportional magnet valve means respectively the same magnetic forces result; and including a valve housing into which said adjustment member is screwed.

5. Proportional magnet valve means for generation of a pressure proportional to applied current, said valve means having a stroke force characterizing line and having a rod, that is connected with an armature surrounded by a pole core structurally arranged about an axis of the magnet valve means and at least one coil means which upon being supplied with current generates and produces a magnet force in connection with said armature and which is directed opposite to means for applying a closure force effective upon the rod, having a basic improvement in combination therewith comprising:

at least one adjustment member provided to adjust particularly the axial position of said armature per se relative to said pole core in a range of the stroke force characterizing line of said valve means so that a predetermined pressure-current-characterizing line is attained; said armature being axially secured upon said rod and only said adjustment member being provided to adjust the axial position of said armature per se relative to said pole core per se;

said armature axially secured upon said rod as to said axis includes having said armature seated axially fixed upon said rod and furthermore in order to attain an accurate pressure-current-association in a mass production of said proportional magnet valve means, there is included a valve seat rotatable in a predetermined desired direction with which said rod and with that said armature correspondingly is adjusted axially relative to said pole core and the adjustment thereof relative to each other is so undertaken that an operating stroke of said armature is so located within entire stroke thereof so that the forces at stroke end of the operating stroke are respectively identical.

\* \* \* \* \*